(12) United States Patent
Ikegaya

(10) Patent No.: US 6,439,663 B1
(45) Date of Patent: Aug. 27, 2002

(54) SEAT RECLINING APPARATUS FOR VEHICLES

(75) Inventor: Isao Ikegaya, Kosai (JP)

(73) Assignee: Fujikiko Kabushiki Kaisha, Shizuoka-Ken (JP)

( * ) Notice: Subject to any disclaimer, the term of this patent is extended or adjusted under 35 U.S.C. 154(b) by 0 days.

(21) Appl. No.: 09/578,620

(22) Filed: May 25, 2000

(30) Foreign Application Priority Data

May 28, 1999 (JP) .......................................... 11-150455

(51) Int. Cl.⁷ ................................................ B60N 2/02
(52) U.S. Cl. ...................................... 297/367; 297/366
(58) Field of Search ................................ 297/366, 367, 297/368, 369, 378.12

(56) References Cited

U.S. PATENT DOCUMENTS

| 4,736,986 | A | * | 4/1988 | Kato et al. ............... 297/366 X |
| 5,161,856 | A | * | 11/1992 | Nishino ...................... 297/367 |
| 5,216,936 | A | | 6/1993 | Baloche |
| 5,590,931 | A | * | 1/1997 | Fourrey et al. ......... 297/367 X |
| 5,678,895 | A | | 10/1997 | Matsuura |
| 5,681,086 | A | | 10/1997 | Baloche |
| 5,779,313 | A | | 7/1998 | Rohee |
| 5,788,325 | A | | 8/1998 | Ganot |
| 5,857,746 | A | * | 1/1999 | Barrere et al. ............... 297/367 |
| 6,007,152 | A | * | 12/1999 | Kojima et al. ............... 297/367 |
| 6,039,400 | A | * | 3/2000 | Yoshida et al. ............. 297/367 |
| 6,082,821 | A | * | 7/2000 | Baloche et al. ......... 297/367 X |
| 6,092,874 | A | * | 7/2000 | Kojima et al. .......... 297/366 X |
| 6,112,370 | A | * | 9/2000 | Blanchard et al. ...... 297/367 X |

\* cited by examiner

Primary Examiner—Peter M. Cuomo
Assistant Examiner—Stephen Vu
(74) Attorney, Agent, or Firm—Kilpatrick Stockton LLP

(57) ABSTRACT

A seat reclining apparatus for vehicles includes a casing, which has a recess and a mount extending from the recess, and a cap, which has a fringe and an inside gear formed along the inner periphery of the cap. The cap is received in the recess of the casing. The fringe of the cap and the periphery of the casing are held together by a binding frame so as not to separate from each other. The binding frame has a groove, and the fringe of the cap and the periphery of the casing are received in the groove. A lock mechanism is placed in the recess of the casing. The lock mechanism includes one or more lock gears. Each lock gear has arched gear teeth, and is movable between a meshed position, at which the lock gear is meshed with the inside gear of the cap, and a retracted position, at which the lock gear is disengaged from the inside gear. A driving shaft penetrating through the cap and the casing. By rotating the driving shaft in prescribed directions, the lock gear is meshed with or disengaged from the inside gear.

13 Claims, 12 Drawing Sheets

FIG.12
FIG.13
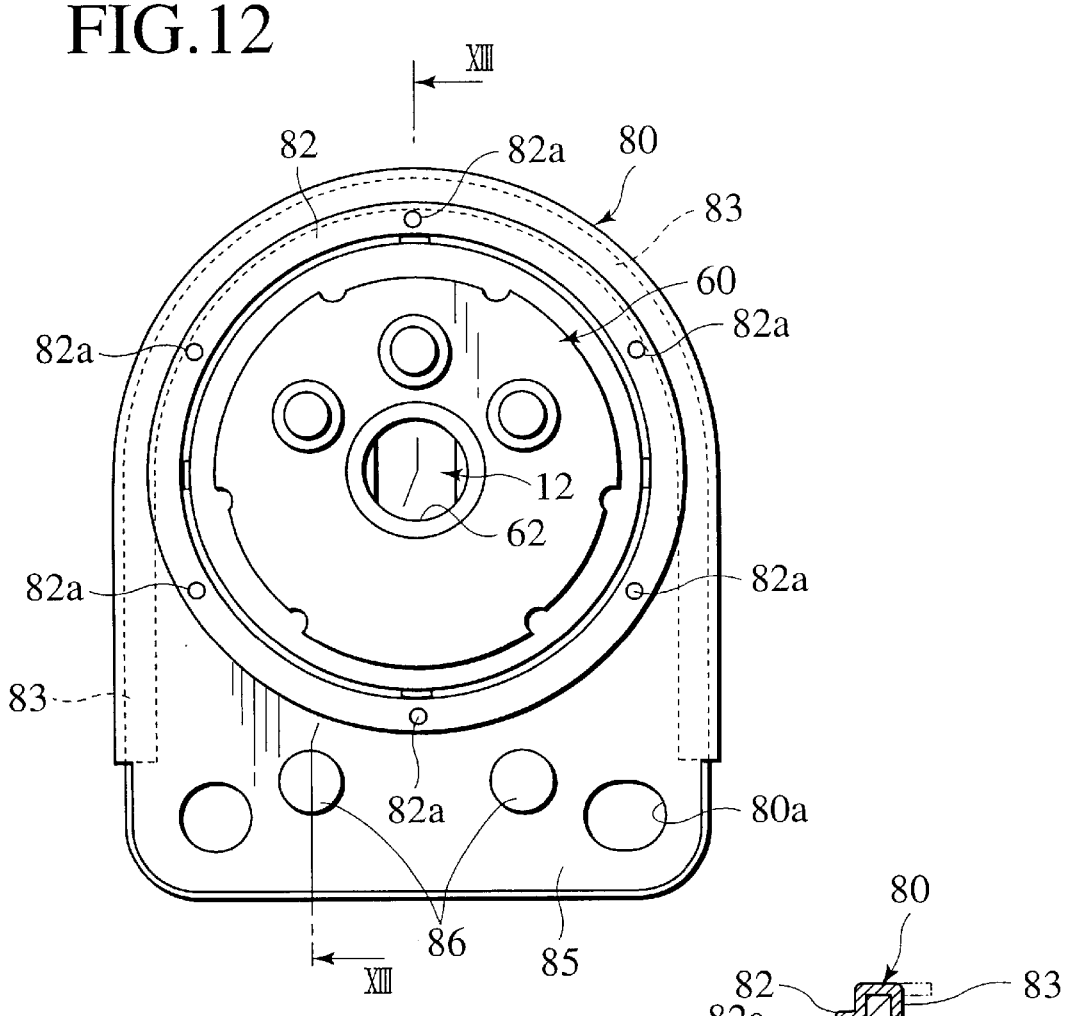
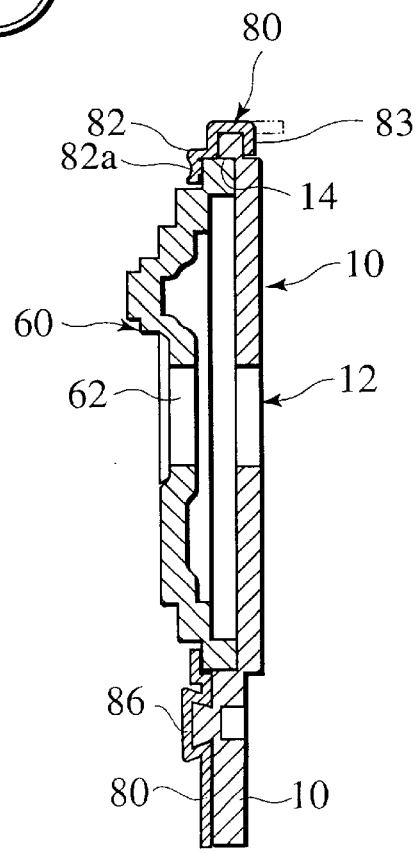

SEAT RECLINING APPARATUS FOR VEHICLES

The present patent application claims the benefit of earlier Japanese Patent Application No. H11-150455, filed May 28, 1999, the disclosure of which is incorporated herein by reference.

BACKGROUND OF THE INVENTION

1. Field of the Invention

This invention relates to a seat reclining apparatus used for vehicles, which allows the back of a seat to be pivoted with respect to the seat cushion.

2. Description of the Related Art

A conventional seat reclining apparatus used in vehicles comprises a round casing and a round cap, which are capable of rotating with respect to each other. Generally, the round casing is attached to the base plate of the seat cushion, while the round cap is attached to the arm plate of the back, and a driving shaft penetrates through the round casing and the round cap. Lock gears are placed in the round casing, and an inside gear is formed along the inner rim of the round cap. By causing the inside gear to be meshed with the lock gears at a prescribed position, the mutual rotation between the round casing and the round cap is stopped. The engagement between the lock gear and the inside gear is released by rotating the driving shaft to retract the lock gear via a cam plate.

The round casing and the round cap are assembled together, and the periphery of the assembled body is covered with a binding member so as not to separate from each other.

The ends of the binding frame are caulked in such a manner that the round casing and the round cap are still allowed to rotate with respect to each other.

Then, the base plate is welded to the round casing, and the arm plate is welded to the round cap.

Since the conventional seat reclining apparatus in use for vehicles requires the caulking and welding steps, the assembling efficiency is not sufficiently high. In addition, the appearances of both the reclining apparatus itself and the reclining seats using this apparatus are unsatisfactory.

SUMMARY OF THE INVENTION

The present invention was conceived by solving these problems in the prior art. It is one of the objectives of the invention to provide a seat reclining apparatus for vehicles that can improve the assembling efficiency and the appearances of both the seat reclining apparatus itself and the reclining seat using it.

In order to achieve the objective, in one aspect of the invention, a seat reclining apparatus for a vehicle includes a casing having a round recess and a mount extending from the rim of the round recess, and a cap having a fringe that fits into the round recess. A driving shaft penetrates through the casing and the cap in the center of the cap. A binding frame holds a portion of the fringe of the round cap and at least a portion of the periphery of the casing together, in such a manner that the cap can rotates relative to the round recess of the casing. Lock gears are placed in the round recess of the casing, and a toothed gear (which may be referred to as an inside gear) is formed along the inner face of the fringe of the cap. The seat reclining apparatus also has a lock mechanism, which generally allows the lock gears to be meshed with the inside gear of the cap in order to fix the casing and the cap at a selected position. The lock mechanism is connected to the driving shaft. When releasing the engagement between the lock gears and the inside gear, the lock mechanism drives the driving shaft to pull the lock gears toward the center of the recess.

The mount of the casing functions as either a base plate or an arm plate. If the mount is fixed to the seat cushion, it functions as a base plate. If the mount is fixed to the seat back, it works as an arm plate.

The seat reclining apparatus further has an arm plate, and a coil spring for forcing the coil spring in a predetermined direction. In this case, the mount of the casing functions as a base plate, and the arm plate is fixed to a seat back. Then, the coil spring pushes the arm plate toward the front end of the seat cushion.

Preferably, the binding frame is horseshoe (or U-shaped) so as to correspond to the outline of the casing. The binding frame has a groove along the curve. The groove receives a portion of the periphery of the casing and a portion of the fringe of the cap. The binding frame may have expanded areas at both ends, which also correspond to the outline of the casing, and a hole is made in each of the expanded areas.

Since the mount of the casing functions as a base plate, the welding step, which was required in the prior art to secure the casing to a separate base plate, is eliminated. Consequently, the assembling process can be simplified, and an appearance is greatly improved.

The casing and the cap are held together by a binding frame in such a manner that they are still capable of rotating relative to each other. The periphery of the casing and the fringe of the cap are simply inserted into the groove of the binding frame. Thus, the structure and the appearance of the seat reclining apparatus are improved, and at the same time, the assembling process is simplified.

In another aspect of the invention, The binding frame has substantially the same shape as the casing, but has an opening that receives the cap. The binding frame has a fold-back along a portion of its periphery. The edge of the fold-back is either straight or curled so that the casing and the fringe of the cap are held together by the fold-back, while being capable of rotating relative to each other.

The fold-back may be formed along the entire periphery of the binding frame so that the whole area of the mount of the casing is held. Preferably, the entire edge of the fold-back is curled.

BRIEF DESCRIPTION OF THE DRAWINGS

Other objects, features, and advantages will be apparent from the following detailed description in conjunction with the attached drawings, in which

FIG. 12 illustrates in a front view the assembly of the casing and the cap held by the binding frame according to the second embodiment of the invention, from which a part of the lock mechanism is omitted;

FIG. 13 is a cross-sectional view taken along the XIII—XIII line shown in FIG. 12;

DETAILED DESCRIPTION OF THE PREFERRED EMBODIMENT

First Embodiment

Figure 5:
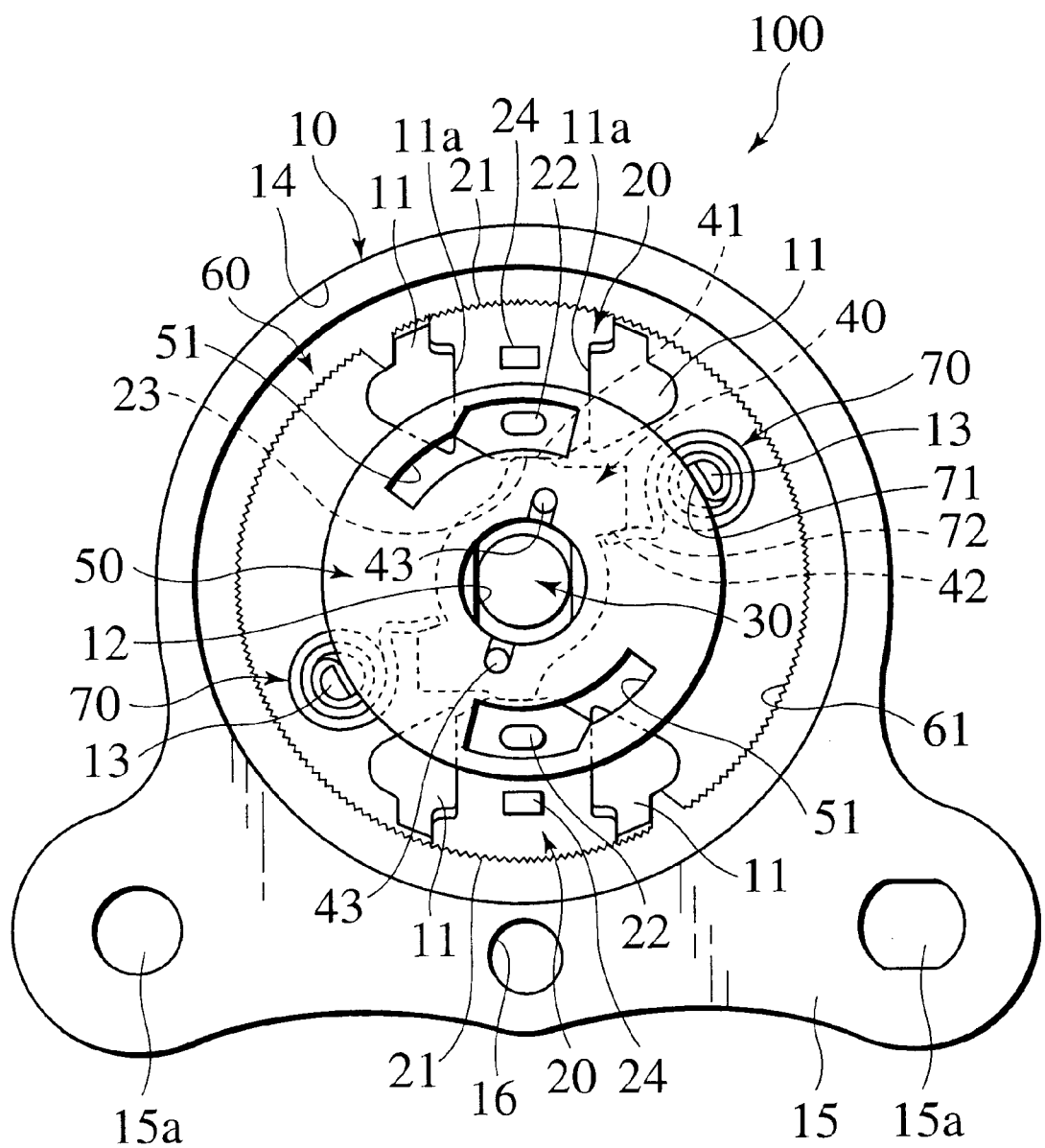
FIG. 5 illustrates a part of the lock mechanism accommodated in the recess of the casing.
Figure 6:
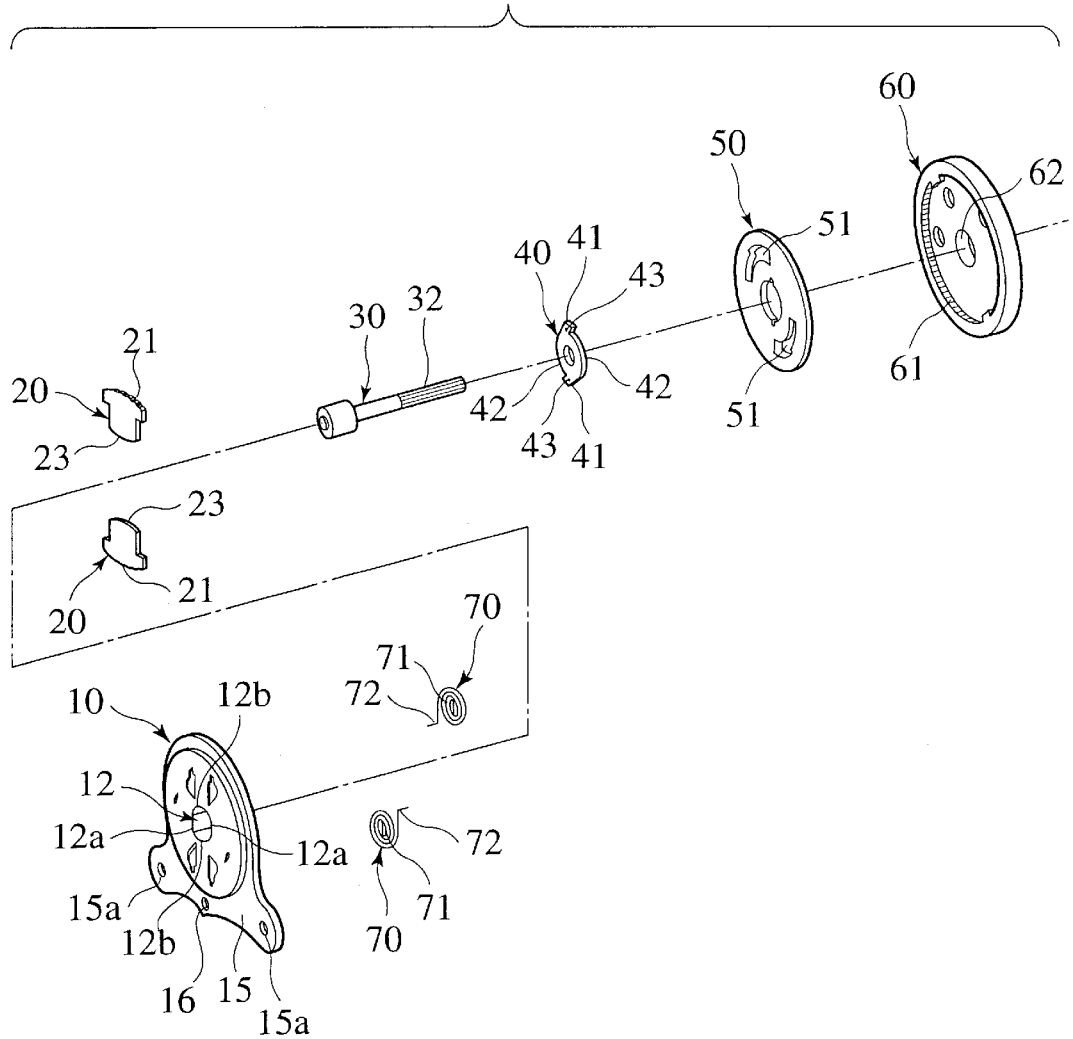
FIG. 6 is an exploded perspective view of the lock mechanism.
Figure 7:
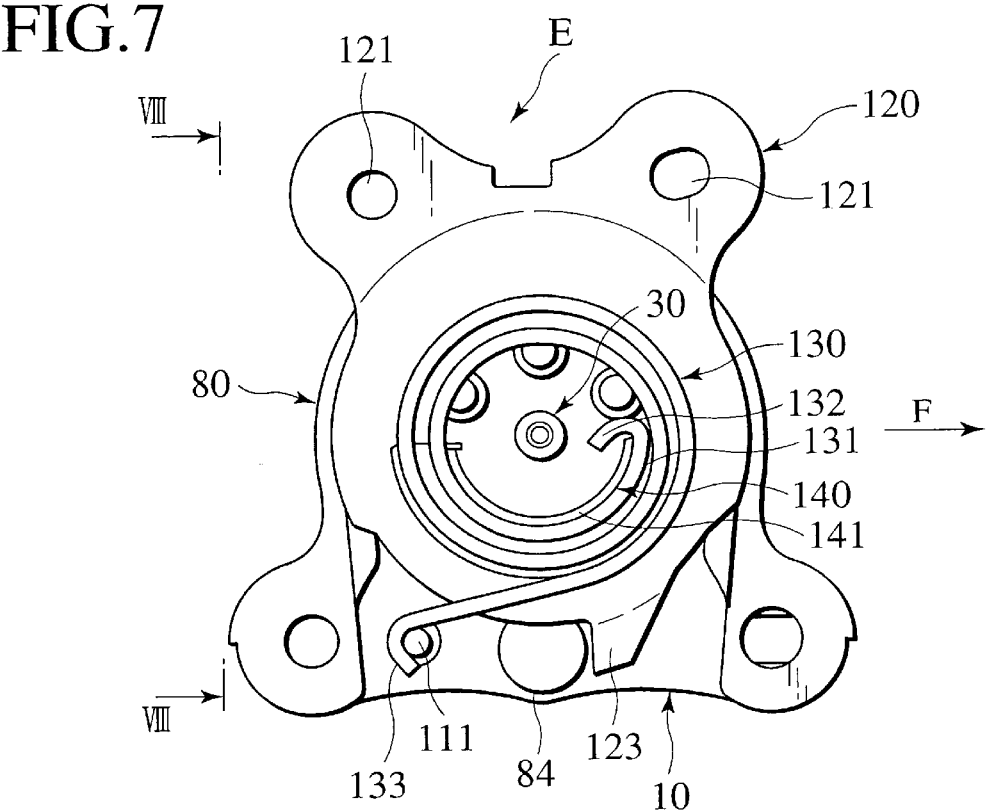
FIG. 7 is a front view of the seat reclining apparatus for vehicles according to the first embodiment of the invention.

FIGS. 1 through 11 illustrate a seat reclining apparatus in use for vehicles in accordance with the first embodiment. The entire appearance of the seat reclining apparatus E of the first embodiment is illustrated in FIG. 7 in a front view. The detailed structure of this apparatus will be explained below.

Figure 2:
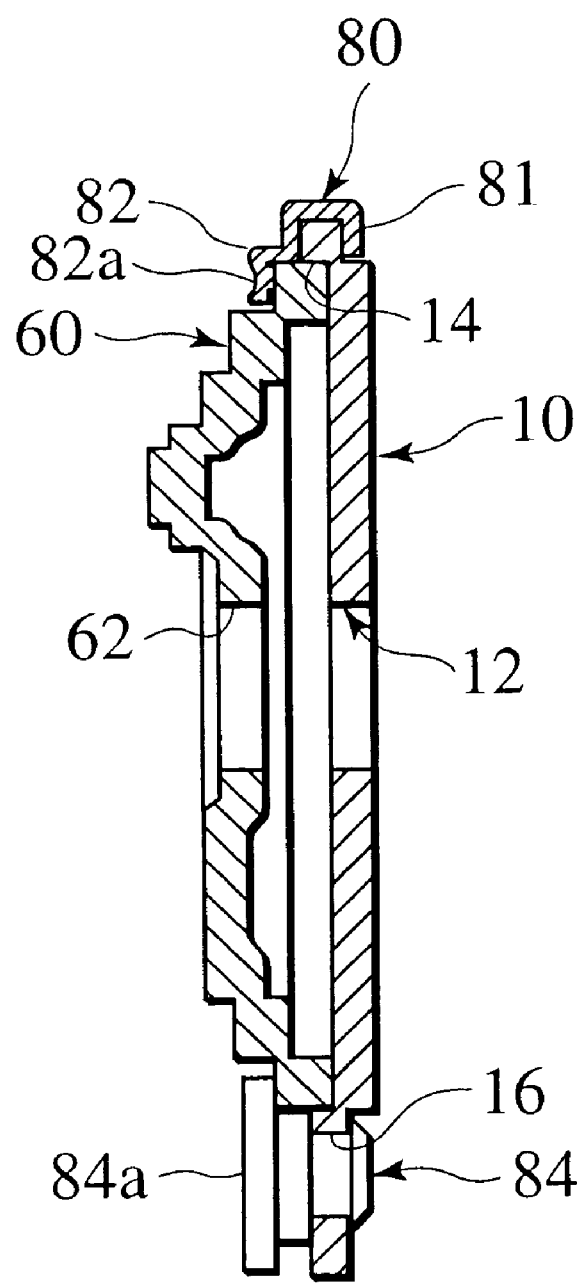
FIG. 2 is a cross-sectional view taken along the II—II line shown in FIG. 1.
Figure 4:
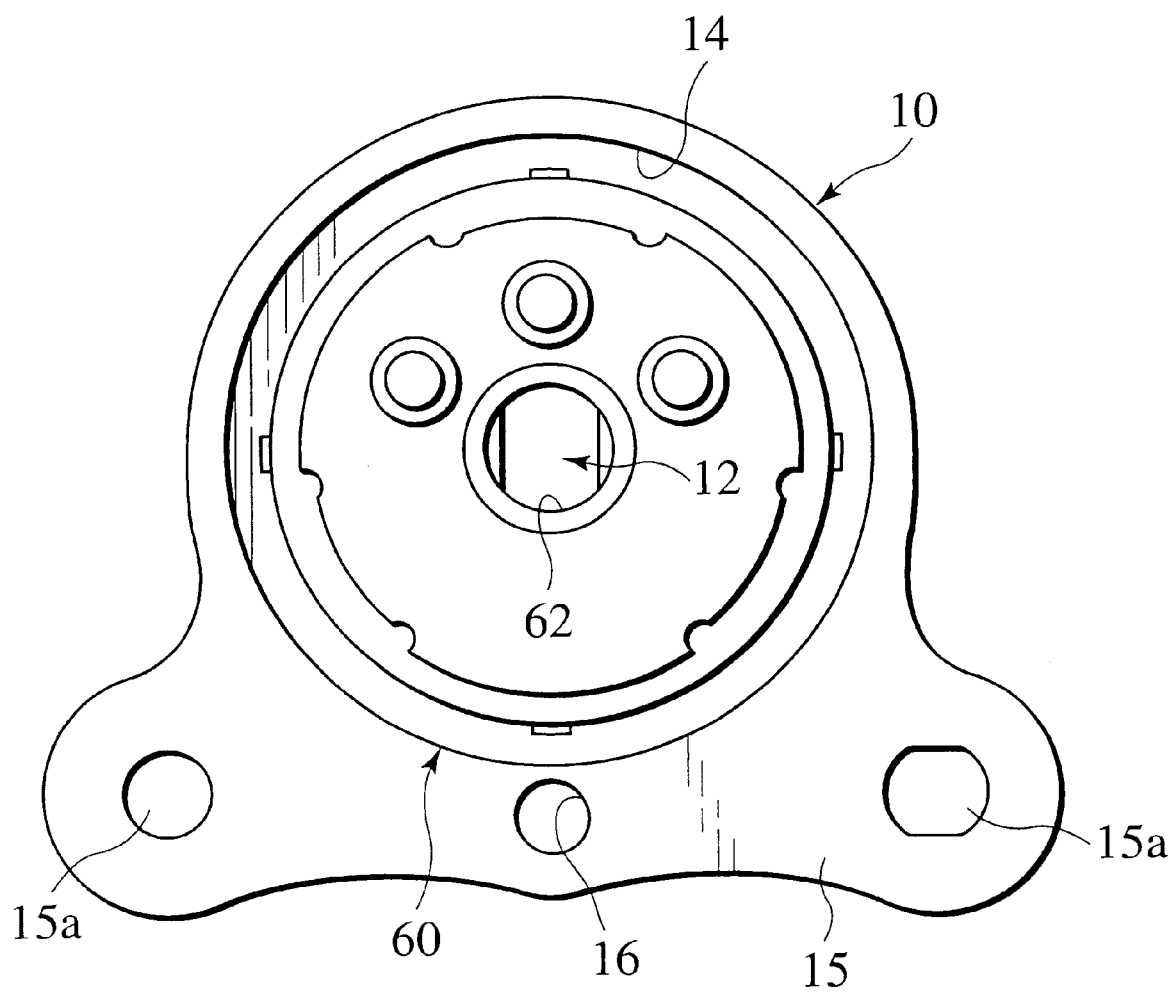
FIG. 4 illustrates the cap placed in the recess of the casing in a front view.

The seat reclining apparatus has a casing 10, a cap 60, and a binding frame 80 for holding the casing 10 and the cap 60 together. The casing 10 has a round recess 14 and a mount 15 that extends from the rim of the round recess, as shown in FIG. 2. In this embodiment, the casing 10 has a mount 15, which functions as a base plate. The mount 15 is fixed to the seat cushion in the later process. The cap 60 has a fringe that fits into the round recess 14, as shown in FIGS. 2 and 4. A driving shaft 30 penetrates through the casing 10 and the cap 60, as shown in FIGS. 5 through 7.

Figure 1:
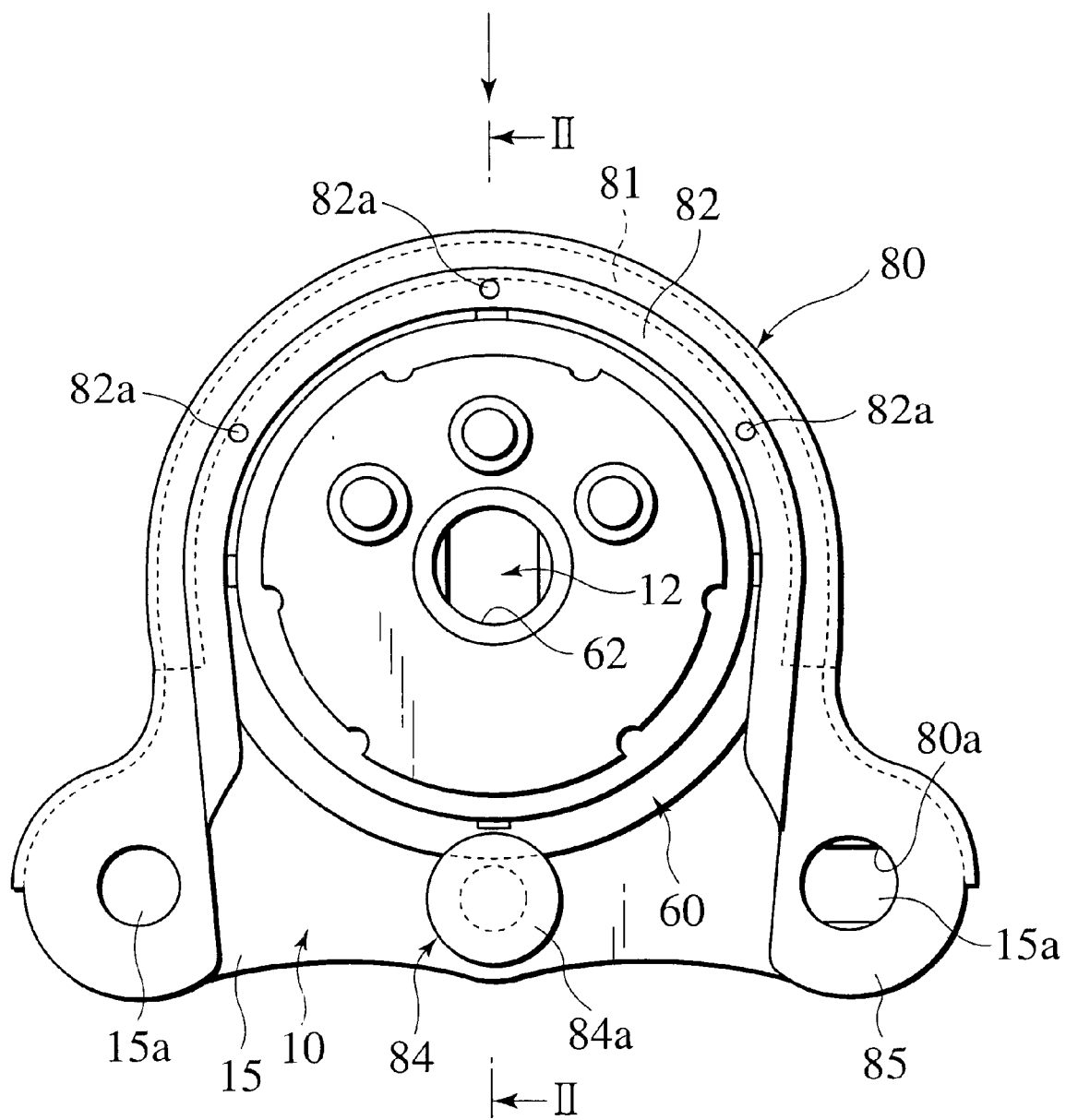
FIG. 1 illustrates in a front view the assembly of the casing and the cap held together by the binding frame according to the first embodiment of the invention, from which a part of the lock mechanism is omitted for purposes of clearly demonstrating the structure of the apparatus.

A binding frame 80 is nearly U-shaped (or horseshoe) so as to fit the outline of the casing 10. The binding frame 80 has a slot 81 and a weighting flange 82 along the arched portion, as shown in FIGS. 1 and 2. The slot 81 and the space defined by the weighting flange 82 comprise a groove. A portion of the fringe of the cap 60 and a portion of the periphery of the casing 10 are fit into the groove of the binding frame 80, in such a manner that the cap 60 can rotates relative to the round recess 14 of the casing 10.

The seat reclining apparatus has a lock mechanism 100, which is illustrated in FIG. 5. Lock gears 20 are placed in the round recess 14 of the casing 10, and a toothed gear (which may be referred to as an inside gear) 61 is formed along the inner face of the fringe of the cap 60. The lock mechanism 100 generally keeps the lock gears 20 meshed with the inside gear 61 of the cap 60 to fix the casing 10 and the cap 60 at a selected position. The lock mechanism 100 is connected to the driving shaft 30. When releasing the engagement between the lock gears 20 and the inside gear 61, the lock mechanism 100 drives the driving shaft 30 to pull the lock gears 20 toward the center of the recess 14.

Figure 8:
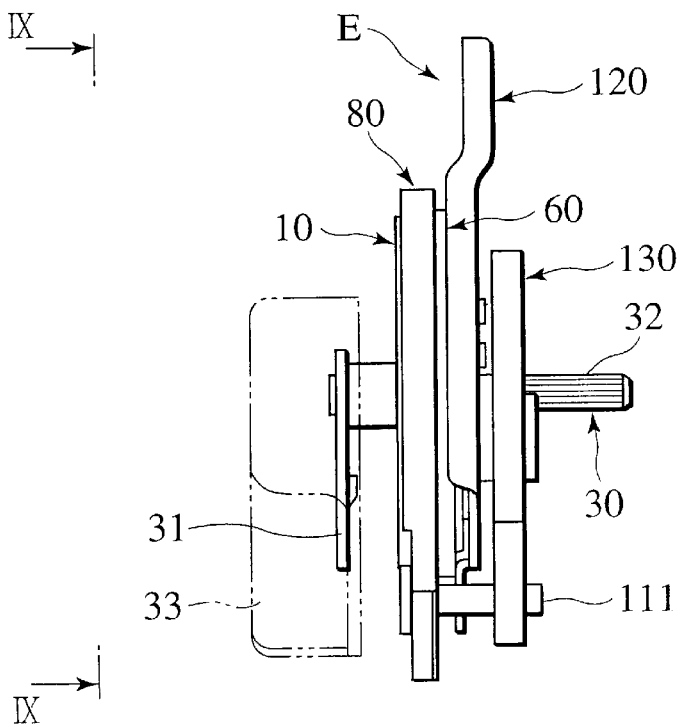
FIG. 8 is a cross-sectional view taken along the VIII—VIII line shown in FIG. 7.
Figure 9:
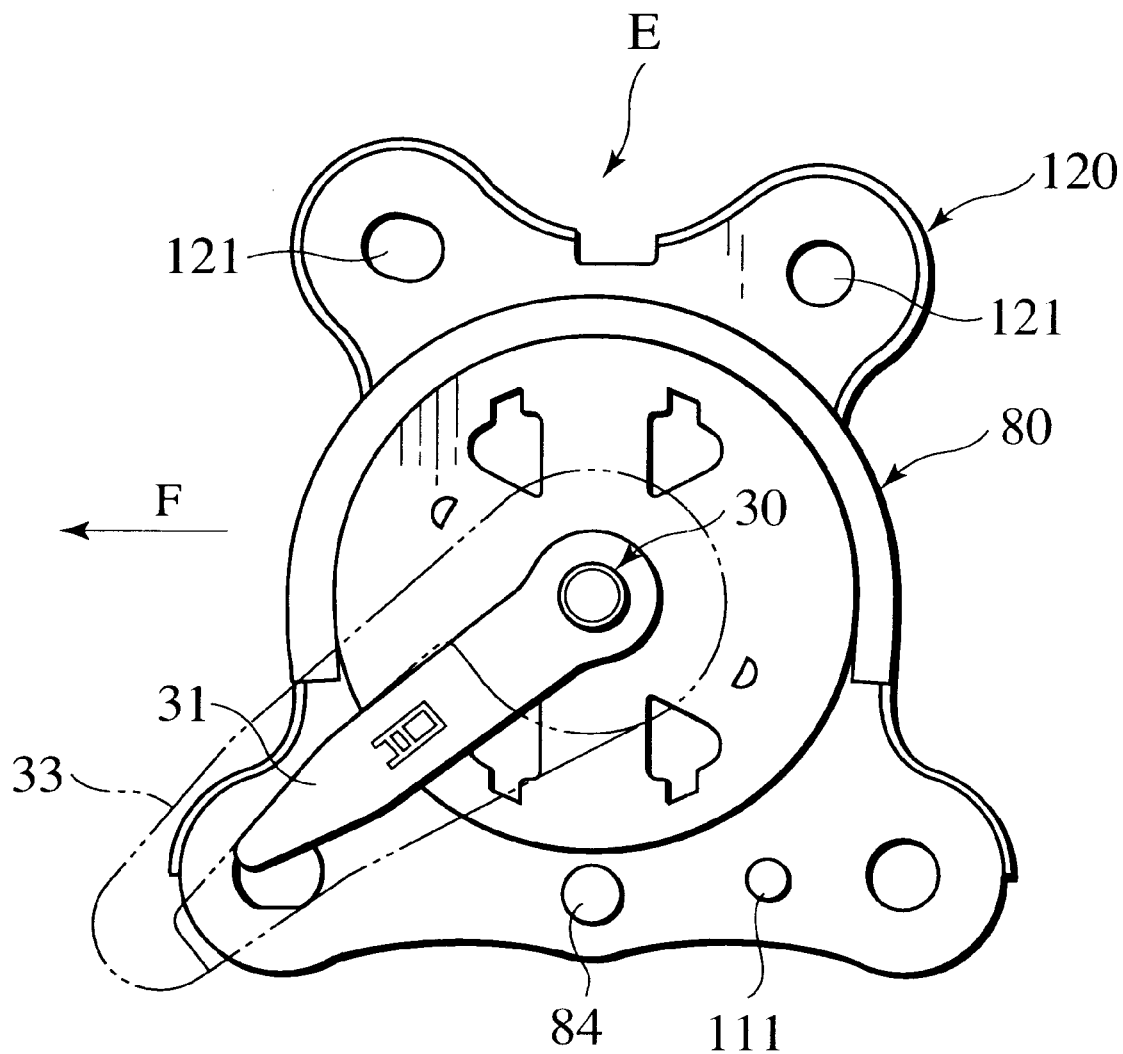
FIG. 9 is a cross-sectional view taken along the IX—IX line shown in FIG. 8.

The seat reclining apparatus also has an arm plate 120, which is overlaid on the cap 60 and the casing 10, as shown in FIG. 8. The arm plate 120 will be fixed to the back of the seat (not shown) in the later process. A coil spring 130 is attached to the arm plate 120 in order to force the arm plate 120 toward the front end of the seat cushion (which is indicated by the arrow F in FIG. 7). Although, in the first embodiment, the arm plate is fixed to the seat back and the mount of the casing is secured to the seat cushion, the arm plate may be fixed to the seat cushion, with the mount secured to the seat back.

Returning to FIG. 5, the casing 10 has a hole 12 in the center, and the cap 60 has a hole 62 in the center. A driving shaft 30 penetrates through the casing 10 and the cap 60 via the holes 12 and 62. A cam 40 (which is indicated by the dashed line in FIG. 5) is attached to the driving shaft 30. As the driving shaft 30 rotates counterclockwise, the cam 40 causes the lock gears 20 outward (toward the inside gear 62). A disc 50 having a pair of cam grooves 51 is placed over the cam plate 40. The disc 50 rotates in synchronization with the cam 40, but drives the lock gears 20 inward. Springs 70 usually force the lock gears 20 toward the circumference of the cap via the cam 40. The spring force causes the lock gears 20 to be meshed with the inside gear 61, which prevents the rotation of the cap 60 relative to the casing 10. By releasing the engagement between the lock gears 20 and the inside gear 61, the driving shaft 30 is rotated clockwise (in FIG. 5) to draw the lock gears 20 back toward the center via the disc 50.

The disc 50 may be omitted. In this case, the cam 40 directly pulls the lock gears 20 toward the center to disengage the lock gears 20 from the inside gear 61.

The mount 15 of the casing 10 has two (in this embodiment) or more holes 15a. The casing 10 is fixed directly to the seat cushion by bolts or pin caulking (not shown) inserted in the holes 15a.

The lock gears 20 are placed in the recess 14 of the casing 10 so as to be symmetric with respect to the driving shaft 30. Each of the lock gears 20 is placed in one of the guides 11 formed in the recess 14. Each guide 11 consists of a pair of parallel leaves 11a, and the lock gear 20 slides in the guide 11 in the radial direction between a meshed position and a retracted position. At the meshed position, the lock gear 20 is meshed with the inside gear 61 of the cap 60, while, at the retracted position, the lock gear 20 is disengaged from the inside gear 61.

The lock gear 20 has a toothed gear 21 arranged in an arch, whose radius of curvature is the same as that of the inside gear 61 of the cap 60. The lock gear 20 also has a projection 22, which is received in the associated cam groove 51 of the disc 50.

Figure 3:
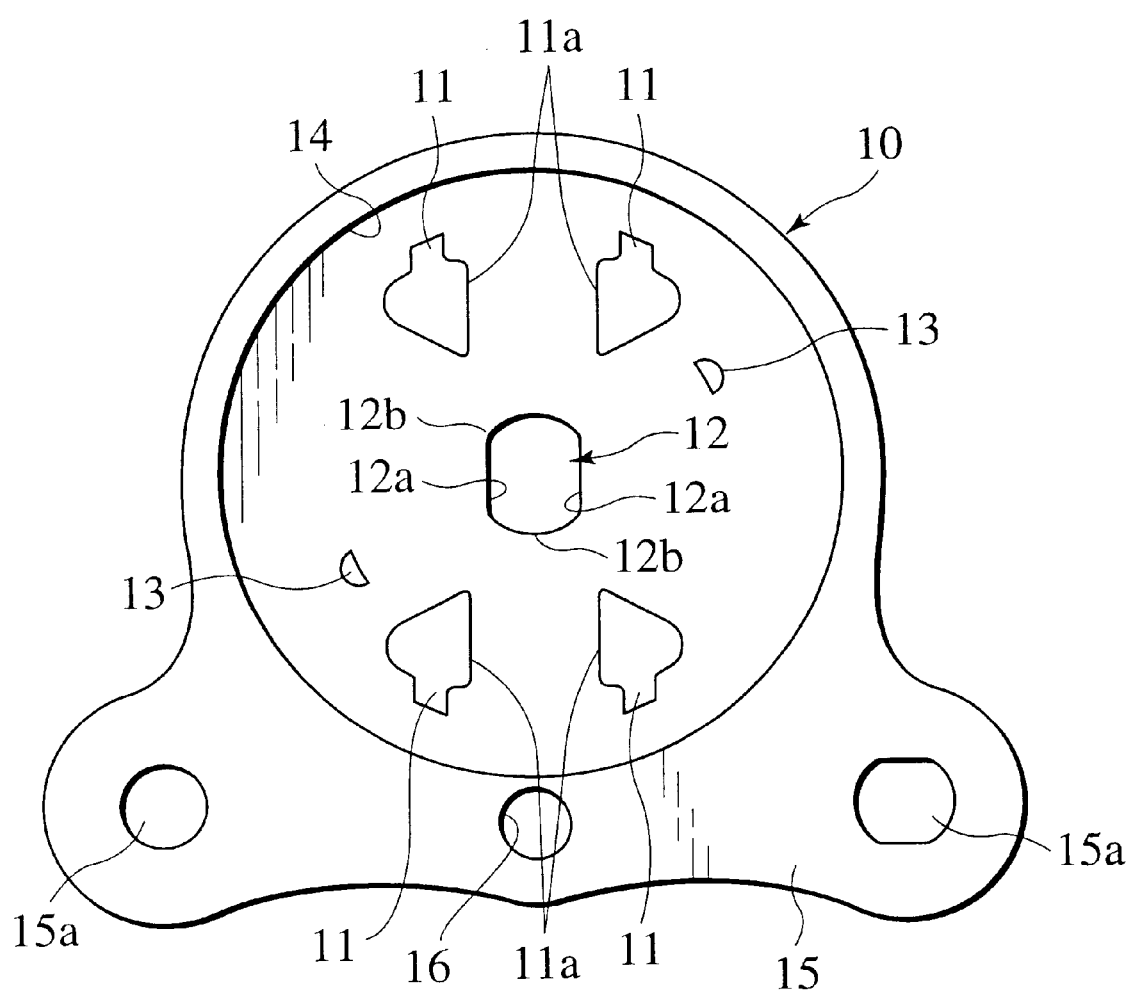
FIG. 3 is a front view of the casing shown in FIG. 1.

The operating shaft 30 is loosely fit into the hole 12 of the casing 10 and the hole 62 of the cap 60. As shown in FIG. 3, the hole 12 of the casing 11 is rounded-rectangular, having a pair of parallel sides 12a aligned in the sliding direction of the lock gear 20, and a pair of arches 12b connecting the ends of the parallel sides 12a. The arches 12b are symmetric with respect to the driving shaft 30. The parallel sides 12a may not be necessarily aligned in the sliding direction of the lock gear 20. The distance between the parallel sides 12a is the same as the diameter of the driving shaft 30. The distance between the arches 12b is set longer than the diameter of the driving shaft 30.

As shown in FIG. 8, the driving shaft 30 has an operating lever 31 at the base that projects from the bottom face of the casing 10. Splines 32 are formed on the remote half of the driving shaft 30, which projects from the top face of the arm plate 120, for purposes of double-side locking connection. The operating lever 31 supports an operating knob 33.

The cam 40 has a hole in the center, which receives the driving shaft 30. The cam 40 is placed in the middle of the shaft 30. The cam 40 has a pair of cam surfaces 41 arranged symmetrically with respect to the driving shaft 30. Each of the cam surfaces 41 comes into contact with the rear end 23 of the associated lock gear 20, and pushes the lock gear 20 outward in the radial direction, as shown in FIG. 5. The cam 40 further has a pair of stop surfaces 42 arranged symmetrically with respect to the driving shaft 30. Each of the stop surfaces 42 comes into contact with the outer end 72 of one of two lock springs 70. The center end 71 of each lock spring 70 is wound around the projection 13 formed in the recess 14 of the casing 10. The outer end 72 of the lock spring 70 always urges the lock gear 20 outward via the cam 40.

The disc 50 has a pair of holes, which receive the projections 43 formed on the cam 40 symmetrically with respect to the driving shaft 30, 180 degrees apart from each other. The engagement of the projections 43 with the holes allows the disc 50 to rotate about the driving shaft 30 in synchronization with the cam 40. The disc 50 also has a pair of cam grooves 51, which receive the projections 22 of the lock gears 20.

The cap 60 is fit into the round recess 14 formed in the casing 10, and is capable of freely rotating relative to the casing 10. An annular inside gear 61, which is meshed with the arched toothed gears 21 of the lock gears 20, is formed in the inner periphery of the round cap 60. Another projection 24 (FIG. 5) is formed on each lock gear 20, between the projection 22 and the toothed gear 21. The projection 24 is in contact with the inner face of the cap 60, whereby the lock gear 20 is kept stable without vibrating or rattling between the cap 60 and the casing 10.

With this lock mechanism 100, the lock gear 20 is urged outward in the radial direction by cooperation of the lock spring 70 and the cam 40, and the arched gear teeth 21 of the lock gear 20 are meshed with the inside gear 61 of the cap 60. The engagement between the lock gear 20 and the inside gear 61 locks the rotation of the cap 60 relative to-the casing 10.

Then, if the driving shaft 30 is rotated clockwise in FIG. 5, the cam surface 41 of the cam 40 is separated from the projection 23 of the lock gear 20. The lock gear 20 retracts toward the center of the recess 14 under the cooperation of the cam groove 51 and the projection 22 of the lock gear 20. Consequently, the arched gear teeth 21 of the lock gear 20 are disengaged from the inside gear 61 of the cap 60, whereby the cap 60 is unlocked. As a result, the arm plate 120 attached to the cap 60 is pivoted forward (in the direction F in FIG. 7) due to the force of the coil spring 130. Details of the arm plate will be explained below.

In the first embodiment, a portion of the periphery of the casing 10 and a portion of the fringe of the cap 60 are held together by a binding frame 80, in such a manner that the cap 60 can rotate in the recess 14 of the casing 10.

The binding frame 80 prevents the cap 60 and the casing 10 from separating from each other. In the first embodiment, the binding frame 80 is made of thin plate, and shaped in a horseshoe so as to fit the outline of the casing 10. The binding frame 80 has a slot 81 for receiving the rim of the casing 10, and a weighting flange 82 for receiving and the fringe of the cap 60. As is illustrated in FIG. 2, the cross-section of the binding frame 80 is a combination of a U-shape and an L-shape. The U-shaped cross-sectional portion functions as the slot, and the L-shaped cross-sectional portion works as a weight. The binding frame 80 also has multiple concaves 82a along the weighting flange 82. The bottom of the concave 82a projects from the rear face of the weighting flange 82 to press the top surface of the cap 60. When the rim of the casing 10 and the fringe of the cap 60 are inserted in the groove of the binding frame 80, an elastic force is applied to the top face of the fringe of the cap 60 by each concave 82a. The elastic force prevents the casing 10 and the cap 60 from shaking in the axial direction. Since each concave 82a contacts the fringe of the cap 60 by point contact at its bottom vertex, friction is minimized so as not to disturb the rotation.

The binding frame 80 has expanded areas 85 at both ends of the U-shaped body, each of which has substantially the same shape as the corresponding leg of the mount 15 of the casing 10. A hole 80a is formed in each expanded area 85. The size and the shape of the hole 80a is substantially the same as that of the hole 15a formed in the mount 15 of the casing 10. The casing 10 and the binding frame 80 are secured to the seat cushion via the holes 15a and 80a.

The casing 10 and the cap 60 are also held together by a stepped pin 84. To be more precise, the stepped pin 84 having a flange 84a is inserted in the hole 16 formed in the center of the mount 15 of the casing 10. The flange 84a presses a portion of the fringe of the cap 60, as shown in FIGS. 1 and 2. The stepped pin 84 also contributes to preventing the vibration of the casing 10 and the cap 60 in the axial direction.

Figure 10:
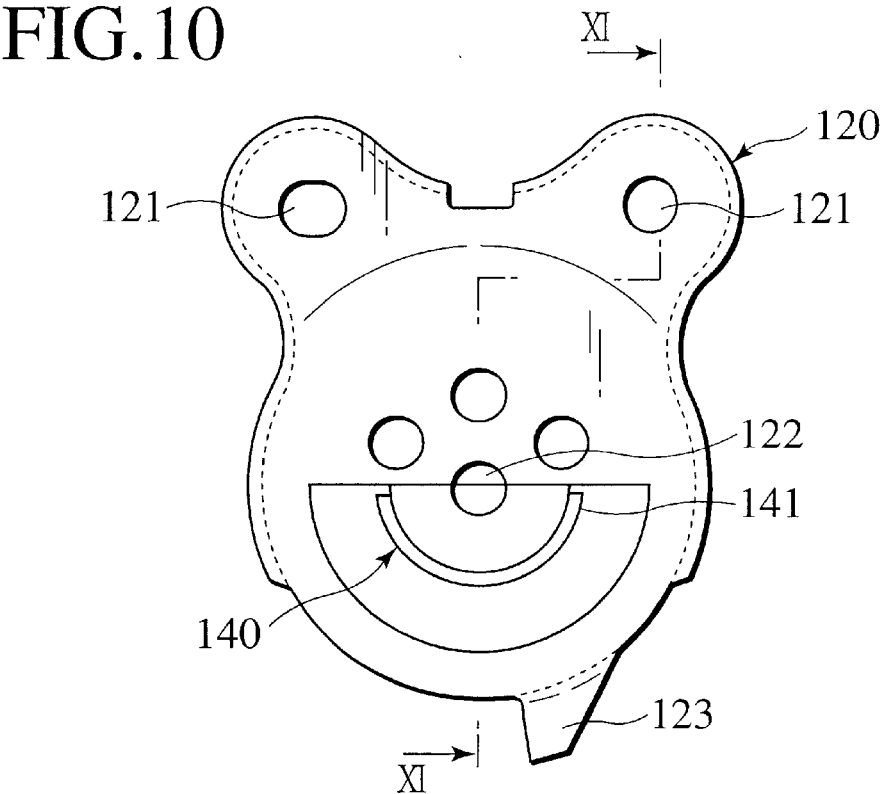
FIG. 10 is a front view of the arm plate used in the seat reclining apparatus shown in FIG. 7.

FIGS. 7 and 10 illustrate the arm plate 120 used in the seat reclining apparatus according to the first embodiment. The arm plate 120 is secured to the outer face of the cap 60. To be more precise, multiple projections (not shown), for example, three are formed on the outer surface of the cap 60, and the same number of holes are formed in the arm plate 120. The projections are fit into the holes of the arm plate 120, and then, the holes and the projections are welded.

The arm plate 120 has ears, and an opening 121 is formed in each ear. A through-hole 122 is formed in the center of the arm plate 120, through which the driving shaft 30 penetrates. The arm plate 120 also has a bank 140 to stop the center end of the coil spring 130.

Figure 11:
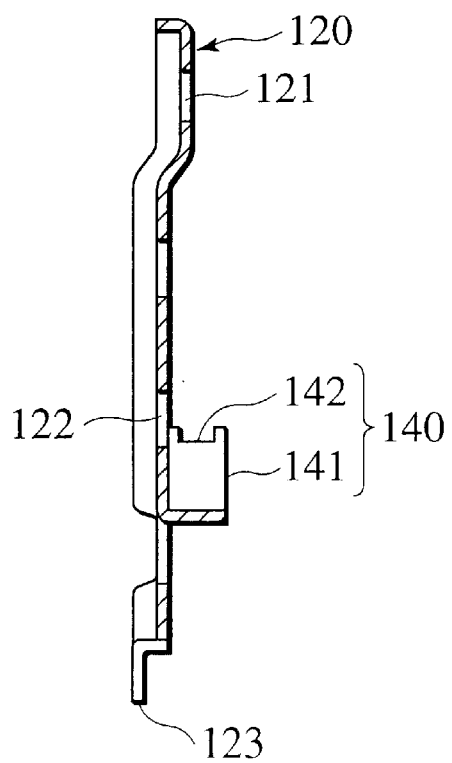
FIG. 11 is a cross sectional view taken along the XI—XI line shown in FIG. 10.

The bank 140 is a semicircular projection extending about the through-hole 122 with a predetermined radius of curvature, as shown in FIG. 10. The bank 140 is formed by cutting up the top surface of the arm plate 120 in a semicircle. The bank 140 has a top face 141, and a groove 142 is formed in the inner side of the bank 140, as shown in FIG. 11. The center end 132 of the coil spring 130 is hooked on one end of the bank 140 and accommodated in the groove 142.

The arm plate 120 has a forward-inclination stopper 123. When the arm plate 120, and therefore, the back of the seat pivots in the front (F) direction, the forward-inclination stopper 123 comes into contact with a stopper pin 111 (FIG. 7), thereby restricting the pivoting movement of the back of the seat. The stopper pin 111 generally serves as a spring lock for locking the peripheral end 133 of the coil spring 130.

As has been described above, the casing 10 has a mount 15 having holes 15a. The mount 15 functions as a base plate, which was separately used in the prior art apparatuses. The casing 10 is fixed to the frame of the seat cushion (not shown) via the holes 15a. This arrangement does not require a welding step for welding the casing 10 to a base plate. Accordingly, both the assembling efficiency and the appearance of the seat reclining apparatus are greatly improved.

Furthermore, since the rim of the casing 10 and the fringe of the cap 60 are simply inserted in the groove of the binding frame 80, assembly of the seat reclining apparatus is greatly facilitated. The appearance of the seat reclining apparatus is also improved.

Each concave 82a formed along the hem of the binding frame 80 applies an elastic force to the cap 60, and the casing 10 and the cap 60 are reliably held together without vibrating in the axial direction, while keeping the cap 60 rotatable relative to the casing 10.

Second Embodiment

FIGS. 12 through 15 illustrate a seat reclining apparatus according to the second embodiment of the invention. The same elements as those in the first embodiment are denoted by the same numerical references, and explanations for them will be omitted.

In the second embodiment, the casing 10 is square at one end, and rounded at. the other end, as shown in FIG. 12. The binding frame 80 has the substantially the same outline as the casing 10, and has a round hole which corresponds to the recess 14. Accordingly, the binding frame 80 covers the top surface of the casing 10, other than the recess 14. A portion of the rim of the binding frame 81 is folded or bent so as to form a groove along its periphery. The fringe of the cap 60 and the periphery of the casing 10 are received together by the groove, in such a manner that the cap 60 can rotate relative to the casing 10.

In the second embodiment, the entire fringe of the cap 60 is held down by the weight of the binding frame 80. As has been mentioned above, the binding frame 80 has a groove along a portion of its periphery. The groove is fabricated by folding or bending the fringe 83 of the binding frame 80 backward, as shown in FIG. 13. In order to assemble the seat reclining apparatus of the second embodiment, the cap 60 is first fit into the recess 14 of the casing 10, and then, the binding frame 80 is placed over the casing 10 with the fringe 83 unfolded. The fringe 83 is folded back by a curling process so as to allow the cap 60 to rotate relative to the casing 10.

The seat reclining apparatus of the second embodiment also has embossments 86 to caulk the casing 10 and the binding frame 80. The embossments 86 are provided for purposes of preventing the cap 60 and the casing 10 from separating from each other in the axial direction. The embossments 86 are formed by an ordinary embossing caulking process after the casing 10, the cap 60, and the binding frame 80 are assembled.

Figure 14:
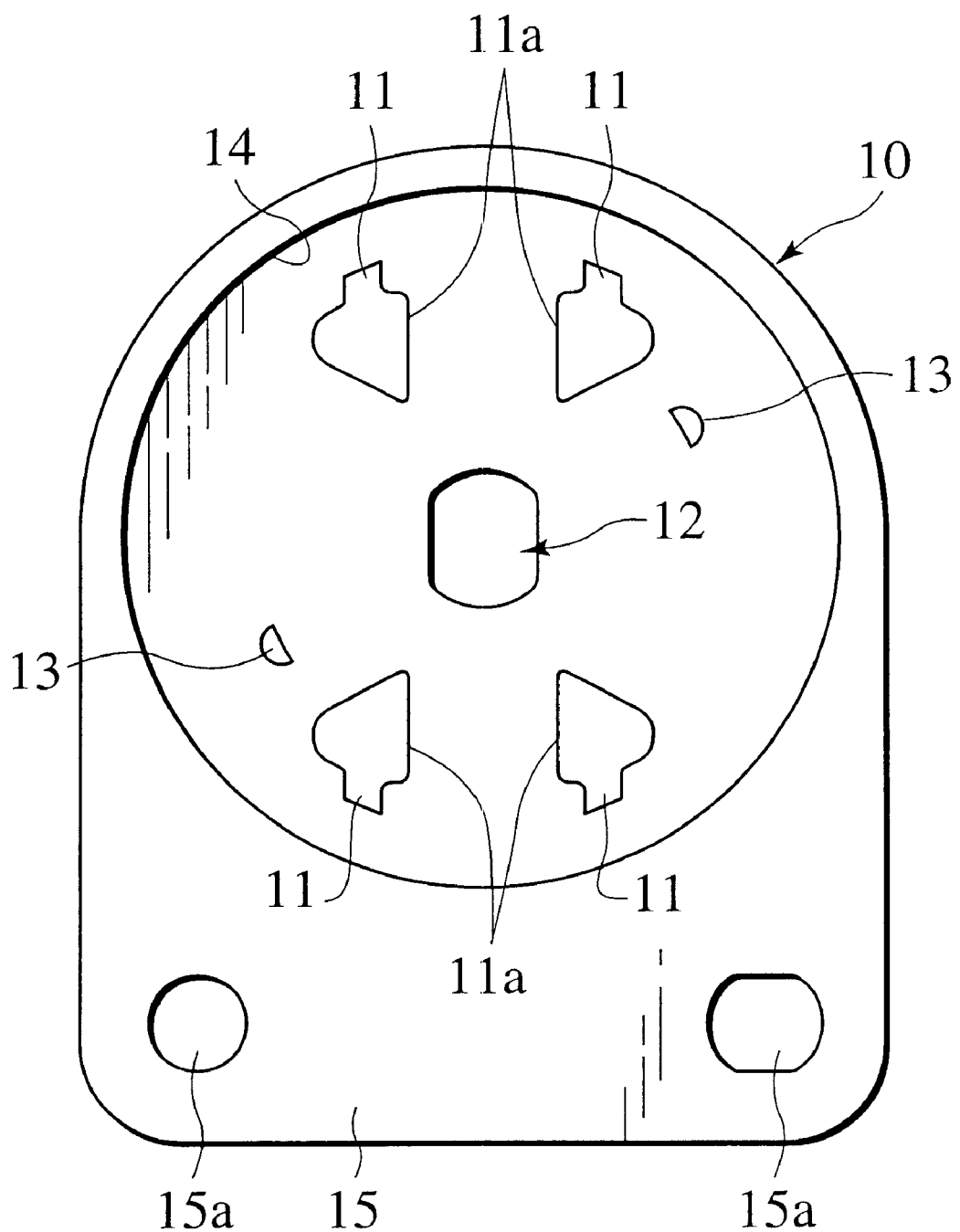
FIG. 14 is a front view of the casing shown in FIG. 12.

The casing 10 has a squared mount 15, as shown in FIG. 14, which functions as a base plate. Two holes 15a are formed near the corners of the mount 15. The binding frame 80 also has a mount 85, in which holes 80a are formed so as to correspond to the holes 15a of the casing 10. The casing 10 and the binding frame 80 are secured to the frame of the seat cushion (not shown) via the 15a and 80a. This arrangement does not require a welding step, unlike the prior art apparatus.

Using the binding frame 80 of the second embodiment, the appearance of the seat reclining apparatus is also improved.

Although, in the second embodiment, the mounts of the casing 10 and the binding frame 80 are fixed to the seat cushion, they may be secured to the back of the seat. In this case, the arm plate 120 will be fixed to the seat cushion.

Figure 15:
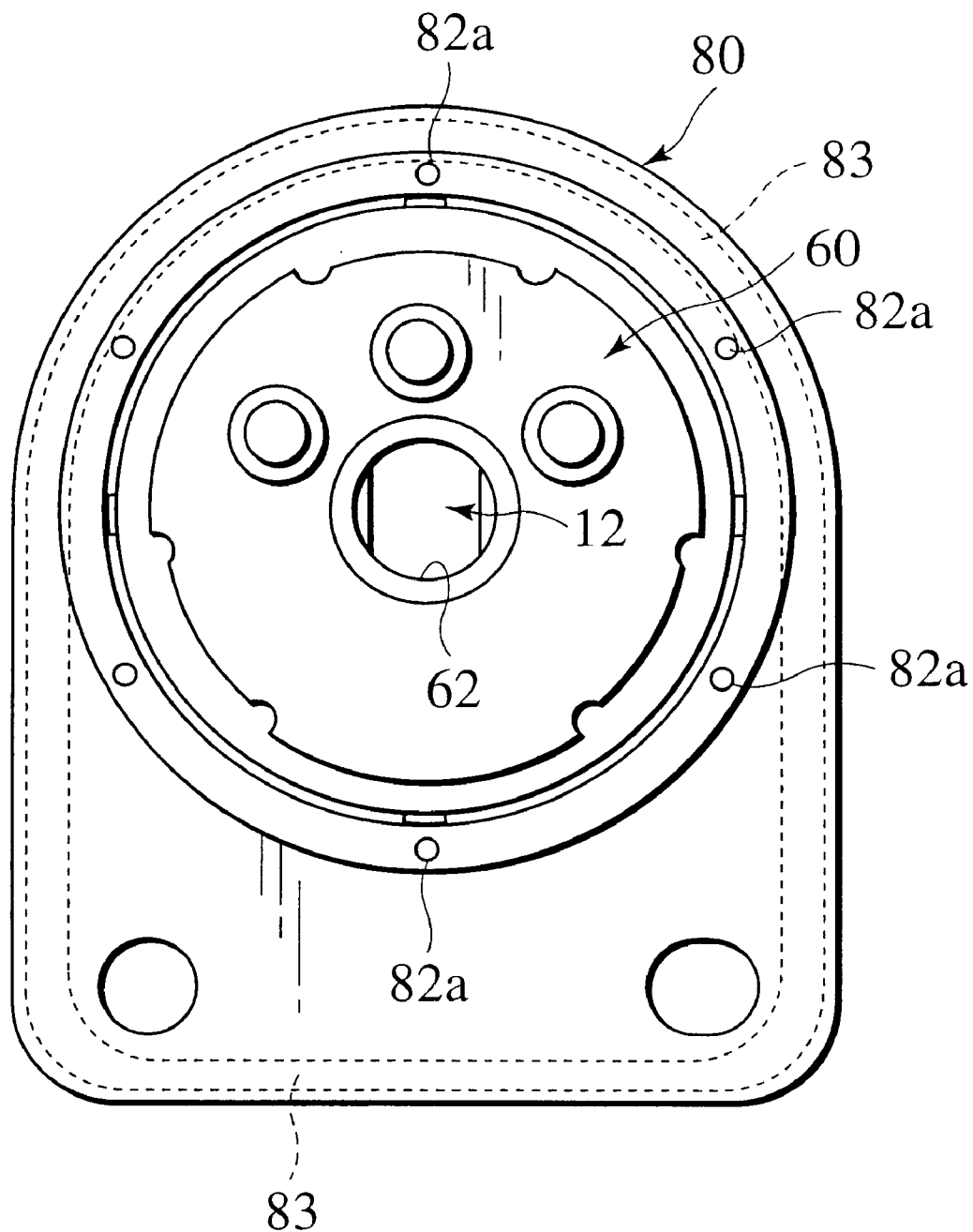
FIG. 15 illustrates in a front view a modification of the assembly of the casing and the cap held together by the binding frame, from which a part of the lock mechanism is omitted.

FIG. 15 illustrates a modification of the binding frame 80 of the second embodiment. The groove is formed along the entire periphery of the binding frame 80. With this arrangement, the entire fringe of the cap 60 is held down by the binding frame 80, and the entire periphery of the casing 10 is also held by the fold-back 83 of the binding frame 80. The binding frame 80 has a fringe 83 along its entire periphery. To assemble the seat reclining apparatus, the cap 60 is placed in the recess 14 of the casing 10, and the binding frame 80 is placed over the cap 60 and the casing 10. Then, the fringe 83 is folded back to support the bottom face of the casing 10. In this manner, the casing 10 and the cap 60 are held together more reliably, while relative rotation between the cap 60 and the casing 10 is still guaranteed.

The seat reclining apparatus of either the first or second embodiment can achieve the advantages of easy assemble and good appearance. The mount, which functions as a base plate, is a part of the casing, and therefore, a welding step required in the prior art is eliminated.

The casing and the cap are held together in a simple manner, while they are kept rotatable relative to each other.

If the groove of the binding frame is formed in advance, the periphery of the casing and the fringe of the cap are simply inserted in the groove.

The groove may be formed after the cap and the binding frame are placed over the casing 10. In this case, the fringe of the binding frame is simply fold back by a curling process. The fringe of the binding frame may be simply bent to form the groove, instead of using a curling process. In either case, the cap and the casing can be held reliably.

Although the invention has been described using specific examples, it should be appreciated that the invention is not limited to these examples. There are many modifications and substitutions within the spirit and the cope of the invention. For example, the number of holes formed in the mount of the casing, and the number of concaves formed along the edge of the binding frame to press the fringe of the cap, are arbitrary. The number of the lock gears is not necessarily two. A single lock gear, or three or more gears, may be used. The shape of the cam 40 is changed in accordance with the number of the lock gears.

What is claimed is:

1. A seat reclining apparatus for vehicles comprising:
   a casing having a recess and a mount extending from the recess, the mount having a mount hole;
   a cap having a fringe extending outwardly and an inside gear formed along an inner periphery of the cap, the cap being received in the recess of the casing;
   a binding frame having a groove for receiving the fringe of the cap and a periphery of the casing, and a frame hole coming into alignment with the mount hole;
   a lock mechanism placed in the recess of the casing and including one or more lock gears, each of said lock gears having arched gear teeth and being movable between a meshed position, at which the lock gear is meshed with the inside gear of the cap, and a retracted position, at which the lock gear is disengaged from the inside gear; and
   a driving shaft penetrating through the cap and the casing, the lock gear being meshed with or disengaged from the inside gear by rotating the driving shaft in predetermined first and second directions.

2. The seat reclining apparatus according to claim 1, wherein the mount functions as a base plate.

3. The seat reclining apparatus according to claim 1, further comprising a stepped pin having a head, the stepped pin penetrating through the casing so that the head presses a portion of the fringe of the cap in order to prevent the cap and the casing from separating from each other.

4. The seat reclining apparatus according to claim 1, further comprising an arm plate secured to a top face of the cap, and a coil spring for urging the arm plate in a certain direction.

5. The seat reclining apparatus according to claim 4, wherein the seat reclining apparatus is for attachment to a seat having a cushion and a back, wherein the arm plate is adapted to be fixed to the back of the seat, and the mount of the casing is adapted to be fixed to the cushion of the seat via the mount hole and the frame hole.

6. The seat reclining apparatus according to claim 4, wherein the seat reclining apparatus is for attachment to a seat having a cushion and a back, wherein the arm plate is adapted to be fixed to the cushion of the seat, and the mount of the casing is adapted to be fixed to the back of the seat via the mount hole and the frame hole.

7. The seat reclining apparatus according to claim 1, wherein the groove of the binding frame receives a portion of the fringe of the cap and a portion of the periphery of the casing.

8. The seat reclining apparatus according to claim 1, wherein the binding frame has a shape complementary to the casing, and has an opening corresponding to the recess of the casing.

9. The seat reclining apparatus according to claim 8, wherein the binding frame covers the top surface of the casing, except for the recess.

10. The seat reclining apparatus according to claim 8, wherein the groove is formed along a portion of the periphery of the binding frame.

11. The seat reclining apparatus according to claim 10, further comprising embossments, wherein the binding frame and the casing are caulked together by the embossments for purposes of preventing the cap and the casing from separating from each other.

12. The seat reclining apparatus according to claim 8, wherein the groove is formed along the entire periphery of the binding frame.

13. The seat reclining apparatus according to claim 12, wherein the groove receives a portion of the fringe of the cap and the entire periphery of the casing.

* * * * *